United States Patent Office 2,726,880
Patented Dec. 13, 1955

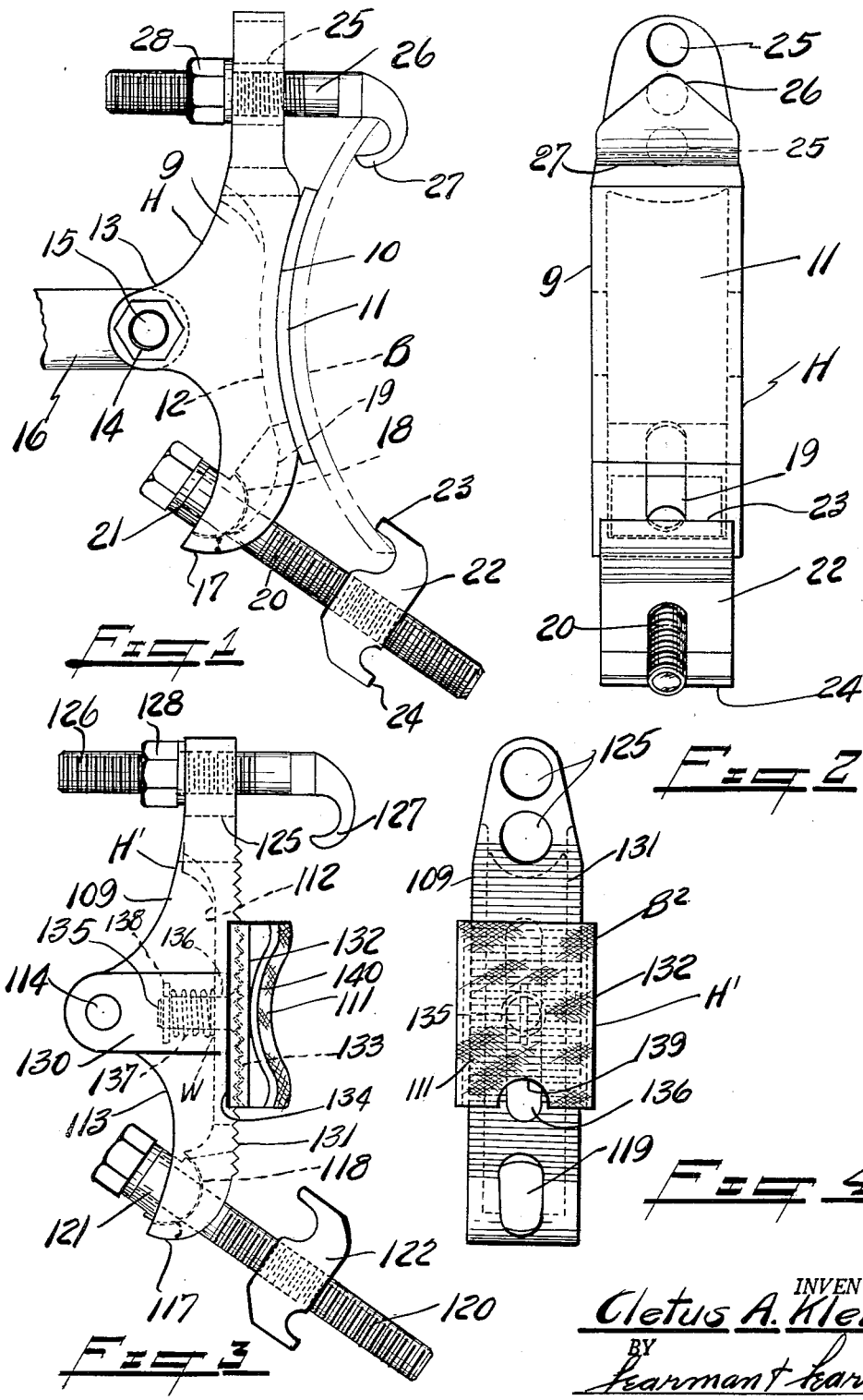

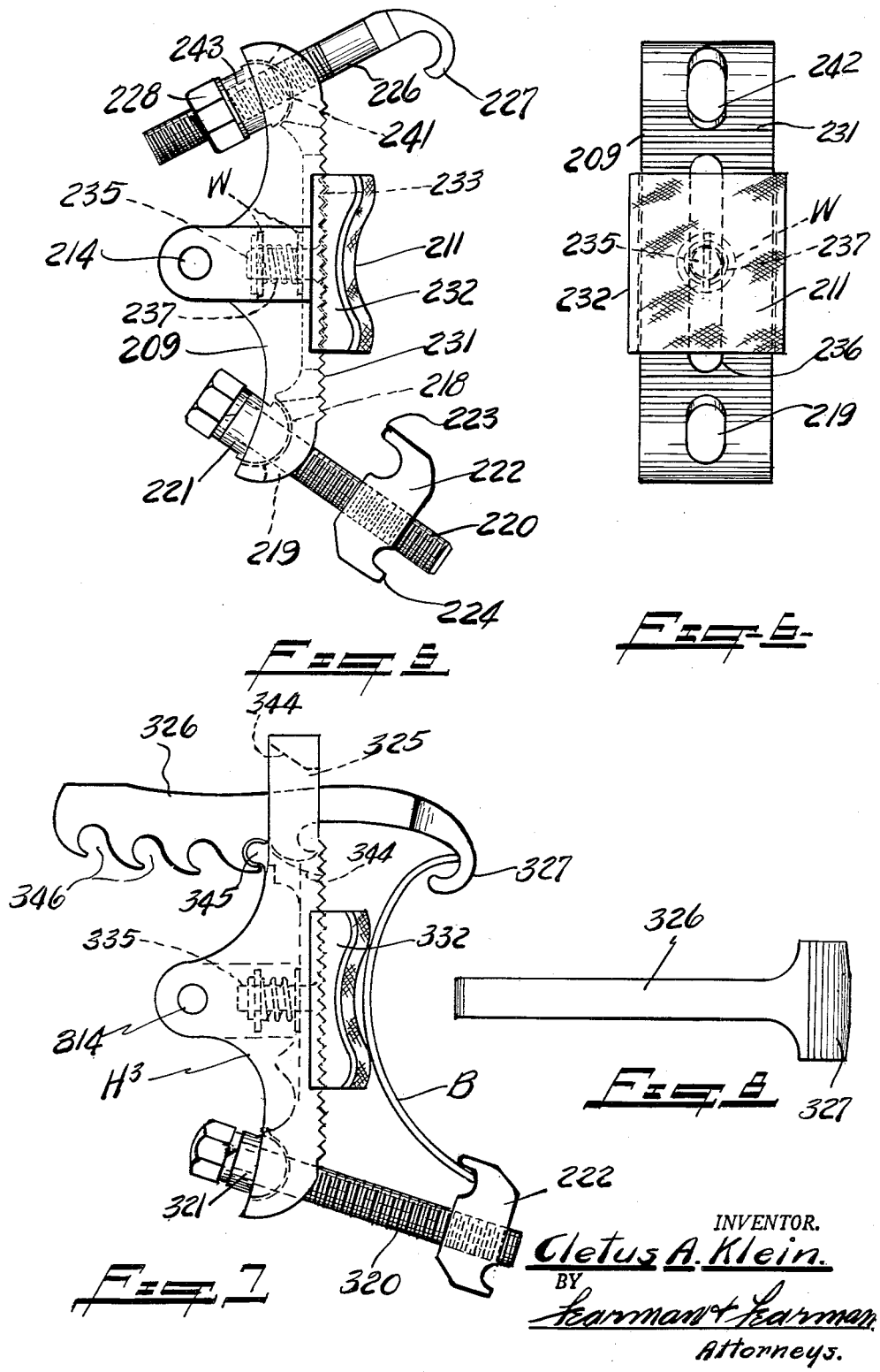

2,726,880

ADJUSTABLE TOW BAR HITCH FOR VEHICLE BUMPERS

Cletus A. Klein, Caro, Mich.

Application February 26, 1953, Serial No. 339,029

17 Claims. (Cl. 280—502)

This invention relates to tow bars for interconnecting two normally independent vehicles so that one may be drawn by the other, and more particularly to a new and improved tow hitch or clamp therefor which can be detachably secured on bumpers of diverse configuration and dimension.

One of the prime objects of the invention is to provide a bumper hitch of simple design which can be readily adjusted to clamp on bumpers of widely varying contour and size and which may be employed at both ends of the tow bar, thus promoting mass production with the result that a considerable saving in manufacturing and repair cost can be effected.

Another object of the invention is to provide a bumper hitch which includes a rockably mounted bumper clamping member for engagement with the one edge of the bumper so that the hitch can be simply and easily secured on any vehicle bumper with a minimum of effort and adjustment.

A further object of the invention is to provide an improved bumper hitch which is strong and durable in construction, and which is also highly effective and reliable in use.

A further object of my invention is to design a bumper hitch which can be economically manufactured and readily assembled on the tow bar.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction without departing from the spirit, or sacrificing any of the advantages of the invention.

In the drawings:

Fig. 1 is a side elevational view of my bumper hitch clamped in position on a vehicle bumper, the bumper being shown in broken lines.

Fig. 2 is an end elevational view of the bumper hitch.

Fig. 3 is a side elevational view of a modified form of my invention.

Fig. 4 is an end elevational view thereof with the bumper clamping member omitted to more clearly illustrate this embodiment of the invention.

Fig. 5 is a side elevational view of still another modification of my invention.

Fig. 6 is and elevational view of the modification shown in Fig. 5.

Fig. 7 is a view similar to Fig. 5 and shows another modification.

Fig. 8 is a top plan view of the clamp shown in Fig. 7.

Referring now to the accompanying drawings wherein I have shown several embodiments of my invention, and more particularly to Figs. 1 and 2, a letter H generally indicates my bumper hitch which includes an upright bearing member or support 9 with its bumper-engaging surface 10 formed to the contour of the outer face of an atuomobile bumper B.

To protect the hitch from marring and/or scratching the chromium-plated bumper B, a pad 11 is bonded to the curved face 10 of the bearing member 9 in any suitable manner as by employing an insoluble glue of a type which adheres to metal.

The bearing member 9 is centrally channeled or recessed as at 12 to provide projecting lip portions 13 which extend out beyond the main body portion of the support 9 and are bored as at 14 to accommodate a bolt 15 which is employed to pivotally secure the hitch H on the clevis 16 of a coupling arm of a tow bar (not shown).

The lower portion 17 of the support 9 is outwardly curved as shown and is angularly recessed, the marginal wall of the recess being curvilinear to form a socket 18 therein. A downwardly inclined passage 19 through the lower portion of the bearing member 9 opens into the socket 18, and a bolt 20 extends therethrough. A hemispherical member 21, adapted to seat in the socket 18, is mounted on the bolt 20, and the passage 19 is of sufficient length to permit a substantial angular adjustment of the bolt 20.

Threaded on the end of the bolt 20 is a clamping member 22 which is formed with oppositely disposed hook portions 23 and 24 of different size, and it is obvious that either may be brought into engagement with the lower edge of the bumper.

The upper end of the bearing member 9 is formed with vertically spaced, bored passages 25, and a threaded member 26 is disposed in any one of them, depending on the width and curvature of the bumper B, the member 26 being formed with a hooked end 27 for engagement with the upper edge of the bumper B. A nut 28 is provided on the opposite end of the member 26 and can, of course, be tightened down to clamp the hitch in engagement with the bumper. These hitches are employed on tow bars in general, usually two on the bumper of the vehicle being drawn and two on the bumper of the towing vehicle.

In clamping the hitches H individually at spaced-apart points on the bumper, the threaded member 26 is first loosely hooked over the upper edge of the bumper B and the member 22 brought into clamping engagement with the lower edge of said bumper, whence the bolt 20 and nut 28 can be simply tightened down to securely clamp the hitch H in place.

In Figs. 3 and 4 of the drawings, a modification of the above-described hitch is shown, the modified hitch being generally designated H'. The hitch H' includes a support member 109 which is channeled or recessed as at 112 to form projecting lip portions 113. Raised reinforcing portions 130 are provided on the lip portions as shown, the ends thereof being bored as at 114 to accommodate the bolt (not shown) which pivotally secures the hitch H' on the clevis of the coupling arm of a tow bar (not shown).

The lower portion 117 of the support 109 is outwardly curved and is recessed to form the angularly disposed socket 118, an angularly disposed passage 119 being provided in communication with said socket. A bolt 120 extends through the passage 119 and a hemispherical member 121 is mounted on the bolt 120 and seats in the socket 118. Provided on the bolt 120 is the clamping member 122 which is adapted to engage the lower edge of the bumper. The upper end of the support 109 is formed with bored passages 125, and a threaded member 126, formed with a hook end 127 to clamp the hitch H' on the bumper, is disposed in one of the passages 125, a nut 128 being provided on the opposite end of the bolt as before.

The face of the support 109 is notched as at 131 and a bearing plate 132 is adjustably mounted thereon, the inner face of said plate being formed with cooperating notches 133 engageable with the notches 131, and the projecting edges 134 of the plate 132 engage the sides of the support 109 to permit sliding movement thereon, and forming a guide which prevents transverse movement of the plate on the support, or the inner face of the plate can be flat, if desired.

An outwardly projecting stud 135 is provided on the inner face of the bearing plate 132 and projects through a slotted opening 136 formed in the face of the support 109. A spring 137 is mounted on the stud 135 and is maintained in compression between the washers W and a cotter pin 138 provided in the free end of said stud to hold the members in assembled relation. Thus, it will be obvious that by compressing the spring 137, the bearing plate 132 can be vertically adjusted on the support 109 as desired, so that well-balanced clamping may be attained at all times.

The bearing plate 132 is reversible end-for-end, one end being formed with a central hemispherical recess 139 to allow its lowermost or highest adjustment without interference from the members 120 or 126, and the bumper-engaging face 140 of the bearing plate 132 is formed to the contour of a bumper with a protective pad 111 secured thereon as before.

In Figs. 5 and 6 I have shown still a further embodiment of my invention wherein the upper and lower ends of the support 209 are substantially the same. An upwardly angled socket 241 is provided at the upper end of the support, and an angularly disposed, slotted passage 242 is provided in communication with the socket 241. A bolt 226 extends through the passage 242, and a hemispherical member 243 is mounted on the bolt and seats in the socket 241, said member being formed with a hooked end 227 for engagement with the upper end of the bumper, and a nut 228 is provided for quick adjustment.

A socket 218 is provided in the lower end of the support 209, and a passage 219 is provided in said socket. A bolt 220 extends through the passage 219, and a hemispherical member 221 is mounted on said bolt and seats in the socket 218, with a clamping member 222 provided on the free end of the bolt and formed with oppositely disposed hook projections 223 and 224, either of which may be brought into engagement with the lower edge of the bumper and the bolt then rotated to tighten, and it will be obvious that in this form of the invention, both the member 226 and the bolt 220 are rockable in a vertical plane and angularly adjustable as desired.

In Figs. 7 and 8 of the drawings I have shown still another modification in which the upper end of the support H3 is formed similar to that shown in Fig. 1 of the drawings, the member 26 being replaced by the clamping member 326, and a slotted opening 325 replaces the openings 25, the end walls of the opening being upwardly inclined as at 344, and a rib 345 spans the back face of the support.

The clamp member 326 is of a width to freely slide in the slot 325, and the lower edge of the clamps are formed with a plurality of spaced-apart hook-shaped notches 346 releasably engageable with the rib 345, so that the clamp member may be adjusted to suit the bumper to which it is attached, and it will be further obvious that the engaging end 327 of the clamp may be swung about the rib 345 so that it may be readily hooked over the upper edge of the bumper.

From the foregoing, it will be obvious that I have perfected a very simple, practical and inexpensive bumper hitch for automotive vehicles and the like.

What I claim is:

1. In a bumper hitch for a bumper of arcuate cross section, an upright support member having a front face for engaging the face of a bumper, said support member having an angularly disposed, integral socket formed in one end thereof at an angle relative to the bumper engaging surface of the support, said latter surface having a passage through the bumper-engaging wall of said support member in communication with said socket, a clamping member including an integral hook on one end thereof rockably mounted in said socket and extending through said passage for engagement with one edge of the bumper, said passage being enlarged relative to said clamping member vertically so that the clamping member is freely pivotal in said socket in a vertical plane, the opposite end of said support member having a substantially flat outer rear surface with a passage formed therein leading through said end of the member, a threaded clamping member for engagement with the opposite edge of the bumper disposed in said passage, the intermediate front face of said support member being curved to accommodate the front face of the bumper, and means bearing on said flat surface for tightening said second-mentioned clamping member to positively lock said hitch in clamped engagement on said bumper for tightening said second clamping member.

2. In a bumper hitch, an upright support member having passages through the ends thereof, clamping members mounted in said passages for engagement with the edges of the bumper, and a vertically adjustable bearing plate mounted on said support member interjacent the ends thereof for engagement with the outer face of a bumper.

3. The combination as defined in claim 2 in which spring means are provided to retain said bearing plate in vertically adjusted position.

4. In a bumper hitch, a support member for vertical disposition adjacent a bumper, said member being formed with passages in the ends thereof and with spaced, transverse notches in the wall thereof adjacent said bumper, clamping members mounted in said passages for engagement with the edges of a bumper, a vertically adjustable bearing plate mounted on said support to engage the outer face of the bumper, the inner face of said bearing plate being formed with transverse notches to cooperate with the notches in said support member, and resilient means holding said notched plates on the notched support in vertically adjusted position.

5. The combination as defined in claim 3 in which a central, vertically disposed slot is formed in the notched wall of said support member, and a lug on said bearing plate extending therethrough, said resilient means comprising a spring mounted in compression on said lug between the free end thereof and the support member.

6. In a bumper hitch, a support member for vertical disposition adjacent a vehicle bumper, said member having passages through the ends thereof, said support member having at least one socket formed in alignment with one of said passages and in communication therewith, clamping members extending through said passages to hook over the edges of a bumper, at least one of said clamping members having a rocker thereon to seat in said socket, a vertically adjustable bearing plate mounted on said support member interjacent the ends thereof for engagement with the outer face of the bumper, and resilient means holding said bearing plate in vertically adjusted position.

7. The combination as defined in claim 6 in which notches are provided on the face of the support member intermediate its ends and the bearing plate is channeled, the transverse wall of said bearing plate channeled portion being formed with spaced notches to cooperate with the notches on the face of said support member.

8. The combination as defined in claim 6 in which the support member is formed with a vertical slot, and a lug is provided on said bearing plate extending therethrough, said lug being provided with a pin through the free end thereof, said resilient means comprising a coil spring mounted on said lug in compression between said pin and the inner face of the support member.

9. In a bumper hitch, an upright support having angularly disposed sockets formed in the end sections thereof, and passages in alignment with said sockets, a clamping member mounted in the upper passage and extending therethrough to hook over the top edge of a bumper, a rocker member mounted on said clamping member and seated in said upper socket, a bolt mounted in the passage in the lower end section of said support and extending therethrough, a rocker on said bolt to seat in the lower socket, a lug having oppositely disposed hooks formed thereon threaded on the free end of the bolt and adjustable into engagement with the lower edge of the bumper, a vertically adjustable bearing member mounted on said support and having a curved face for engagement with the outer face of the bumper, and resilient means normally retaining said bearing member in vertically adjusted position.

10. In a bumper hitch, an upright support provided with an angularly disposed socket formed in the lower end thereof and a passage in alignment with said socket, a bolt mounted in said passage, a hemispherical member mounted on said bolt and disposed in said socket, a lug adjustably mounted on said bolt and engageable with the lower edge of the bumper, a slotted opening in the upper end of said support, an upper clamping member extending through said slotted opening and adjustably connected to said support, a vertically adjustable bearing plate mounted on said support, and resilient means normally retaining said bearing plate in adjusted position.

11. The combination set forth in claim 10 in which the upper clamping member is both pivotally and longitudinally adjustable on said support.

12. The combination defined in claim 10 in which spaced, intermeshing notches are provided on the contacting faces of the support member and bearing member respectively, and the bearing member is channeled for slidable movement on said support.

13. In a bumper hitch for automobile bumpers, an upright support member, clamping members for engagement with the upper and lower edges of the bumper adjustably mounted on the support member adjacent the ends thereof, and a vertically adjustable bearing plate mounted on said support member interjacent the ends thereof for engagement with the outer face of a bumper.

14. The combination defined in claim 13 in which means are provided for retaining said bearing plate in adjusted position on said support member.

15. The combination defined in claim 13 in which intermeshing surfaces are provided on said support member and bearing plate.

16. In a bumper hitch for an automobile bumper of arcuate cross section, an upright support member for engagement with the outer face of a bumper, said support member having a passage through one end thereof, a curved, transversely disposed rib on said support at said passage, a clamping member having at least one recessed socket formed therein at an edge thereof and open to said edge to disengageably receive said rib mounted to rock on said rib, the clamping member extending through said passage and having hook means on the front end thereof for clamping engagement with one edge of said bumper, and a second clamping member adjustably mounted in the opposite end of the support for clamping engagement with the opposite edge of the bumper.

17. The combination defined in claim 16 in which a plurality of said longitudinally spaced sockets are provided in said first-mentioned clamping member.

References Cited in the file of this patent

UNITED STATES PATENTS

| Number | Name | Date |
|---|---|---|
| 2,306,007 | Thorp | Dec. 22, 1942 |
| 2,432,249 | Pearson | Dec. 9, 1947 |
| 2,458,667 | Williams | Jan. 11, 1949 |
| 2,518,816 | Powers | Aug. 15, 1950 |
| 2,542,907 | Dayton et al. | Feb. 20, 1951 |
| 2,569,843 | Adler | Oct. 2, 1951 |
| 2,631,806 | Harder | Mar. 17, 1953 |
| 2,646,290 | Cox | July 21, 1953 |
| 2,668,064 | Bolling | Feb. 2, 1954 |